United States Patent
Sudo

(10) Patent No.: US 7,304,671 B2
(45) Date of Patent: Dec. 4, 2007

(54) IMAGING APPARATUS AND METHOD FOR LOWERING RESOLUTION POWER OF AN IMAGE AND MODIFYING THE FRAME PERIOD

(75) Inventor: Fumihiko Sudo, Kanagawa (JP)

(73) Assignee: Sony Corporation, Tokyo (JP)

( * ) Notice: Subject to any disclaimer, the term of this patent is extended or adjusted under 35 U.S.C. 154(b) by 774 days.

(21) Appl. No.: 10/338,493

(22) Filed: Jan. 8, 2003

(65) Prior Publication Data

US 2003/0128282 A1    Jul. 10, 2003

(30) Foreign Application Priority Data

Jan. 9, 2002   (JP) ............................ P2002-002796

(51) Int. Cl.
*H04N 5/217*   (2006.01)
*H04N 5/228*   (2006.01)

(52) U.S. Cl. .................................... 348/241; 348/222.1

(58) Field of Classification Search ................ 348/241, 348/250, 222.1
See application file for complete search history.

(56) References Cited

U.S. PATENT DOCUMENTS 5,323,238 A * 6/1994 Yoshimura et al. ......... 348/571
5,786,851 A * 7/1998 Kondo et al. ............ 348/222.1
6,253,022 B1 * 6/2001 Strolle et al. ................ 386/109
6,900,832 B1 * 5/2005 Yano ....................... 348/222.1

FOREIGN PATENT DOCUMENTS

| JP | 7 298112 | 10/1995 |
| JP | 11 32241 | 2/1999 |
| JP | 11 177930 | 2/1999 |
| JP | 2001-238189 | 8/2001 |
| JP | 2001-238190 | 8/2001 |

\* cited by examiner

*Primary Examiner*—Ngoc-Yen Vu
*Assistant Examiner*—Nicholas G Giles
(74) *Attorney, Agent, or Firm*—Frommer Lawrence & Haug LLP; Willaim S. Frommer; Thomas F. Presson

(57) ABSTRACT

An image pickup device picks up an image. An image signal in association with the image is filtered in a time axis direction using a digital low-pass filter to generate an image signal having a reduced dynamic resolution power, which is equivalent to an image signal that would be obtained at a longer exposure time. The filtered signal is then subjected to frame skipping processing to generate an output image signal having a preferred frame period. The resultant signal is equivalent to one obtained by a slow shooting.

14 Claims, 6 Drawing Sheets

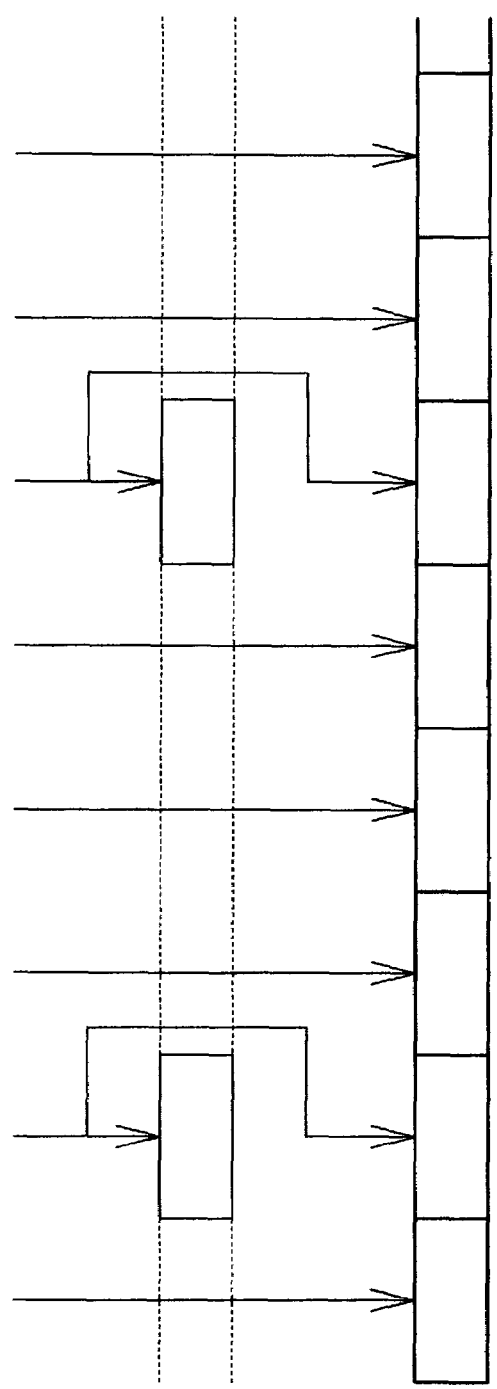
FIG. 8A  FIG. 8B  FIG. 8C  FIG. 8D

IMAGING APPARATUS AND METHOD FOR LOWERING RESOLUTION POWER OF AN IMAGE AND MODIFYING THE FRAME PERIOD

BACKGROUND OF THE INVENTION

1. Field of the Invention

This invention relates to an apparatus and a method for processing an image signal, and imaging equipment.

2. Description of Related Art

In the field of conventional movie production, film cameras have been used. This type of film camera has a mirror 81 mounted on a rotary disk shutter 80 off the open area of the shutter, and an imaging lens 70 and a ground glass 82 of an optical viewfinder aligned on the optical axis of the mirror 81 as shown in FIG. 1. When the rotary disk shutter 80 is positioned in the open area, photographed object images are formed on a film 83, exposing the film 83. Then this stops displaying the photographed object images on the optical viewfinder. When the rotary disk shutter 80 is positioned in the non-open area, frame stepping is carried out for the film 83, with the photographed object images reflected by the mirror 81 and displayed on the ground glass 82 of the optical viewfinder.

Regulation of the period of opening the shutter allows exposure time to be regulated. Changing the frame-stepping rate allows special effects to be obtained. For example, by replaying a high-speed motion picture (i.e. pictures taken at a high frame-stepping rate) at a normal speed, a high-speed motion of an object such as a water droplet dropping on the surface of water can be easily observed in detail. Replaying a low-speed picture (picture taken at a low frame-stepping rate) at a normal speed can enhance the reality of, for example, a fighting scene or a high-speed car chase.

In the field of TV program production, filming (or shooting), editing, and shipping of programs are in the process of digitalization. This is also the case in the field of movie production. That is, owing to the developments of digital techniques for extended definition pictures and to recent price-reduction of digital equipment, the digitalization is also promoted in the world of movie production.

When a video camera utilizing a solid-state image pickup device such as a charge coupled device (CCD) is used to shoot an object, control of shutter opening period of a film camera can be emulated by controlling exposure time using the electronic shutter function of the solid-state image pickup device. Also by controlling the read time required for retrieving a signal from the solid-state image pickup device, film-feeding speed of the film camera can be emulated. Further, since, unlike an optical viewfinder, an electronic viewfinder displays an image based on the signal retrieved from the solid-state image pickup device, the image can be displayed without any break.

Exposure time of a solid-state image pickup device is controlled using the electronic shutter function of the device as shown in FIG. 2A. Thus, a slow shooting (or low-speed shooting) can be obtained by prolonging the time intervals of images to be obtained, which can be done by extending the read time required for reading image data as shown in FIG. 2B. However, if a slow shooting is made in this way, images displayed on the electronic viewfinder are refreshed at a longer interval. As result, when panning the camera to a desired object in motion such that the image of the object is displayed at the center of the electronic viewfinder according to the displayed image on the electronic viewfinder if the object is fast one, the actual position of the image of the object on the imaged picture differs from the displayed position of the object in the viewfinder. Thus, the camera cannot correctly follow the shooting object.

On the other hand, when exposure time is extended while shooting a moving object, a resolution power for object in a time axis direction (hereinafter referred to as "dynamic resolution power") decreases in the shot picture due to an increased movement of the object during one exposure time, making the displayed image blurred on the electronic viewfinder.

In a solid-state image pickup device, noise component called dark current is generated in photo-sensor for performing a photoelectric conversion. It is known that the dark current increases with exposure time. Hence, dark current increases when exposure time is increased to enhance the imaging signal. As a consequence, the margin of the dynamic range of the photo-sensor decreases with exposure time, as shown in FIG. 3. For example, when the object is bright, there are too many of imaging signals for processing to obtain an image having steady reproduction of halftones so as to cause a halation on a bright part thereof. If, in an attempt to increase the margin of the dynamic range, illumination is dimmed or an amount of light entering the solid-state image pickup device is reduced by decreasing the aperture of the object lens, a level of the dark current will not vary but only the intensity of the image signal decreases, thereby resulting in deterioration of the S/N ratio. Hence, a noiseless clear image cannot be obtained in this way.

In a CCD, noise components such as dark current and smear generated in the transmission lines for reading electric charges generated by the photoelectric conversion in the photo-sensor, increase with the read time required for reading signals. Hence, if the read time is increased, the margin of the dynamic range is further decreased according to the noise components, resulting in further deterioration of the S/N ratio.

SUMMARY OF THE INVENTION

It is therefore an object of the invention to provide an apparatus and a method for processing an image signal capable of preventing the lowering of the margin of the dynamic range of the photo-sensor even in slow shooting and capable of providing a high quality image without deteriorating its S/N ratio.

It is another object of the invention to provide imaging equipment capable of preventing the lowering of the margin of the dynamic range of the photo-sensor even in slow shooting and capable of providing a high quality image without deteriorating its S/N ration.

An apparatus for processing an image signal in accordance with one aspect of the invention comprises a filter for filtering an input image signal in a time axis direction thereof, thereby lowering the dynamic resolution power in association with the image signal. The apparatus also comprises a frame skipping processor for performing frame skipping processing on the input image signal thus filtered, thereby obtaining an output image signal having a preferred frame period. The apparatus further comprises a controller allowing for altering a filtering coefficient of the filter means.

A method for processing an image signal in accordance with another aspect of the invention comprises filtering an input image signal in a time axis direction thereof using a digital low-pass filter, thereby lowering the dynamic resolution power in association with the input image signal. The method also comprises performing frame skipping processing on the input image signal thus filtered, thereby obtaining an output image signal having a preferred frame period.

In this arrangement, the input image signal is filtered by means of a digital low-pass filter in time axis direction, thereby lowering the dynamic resolution power in association with the input image signal. The filtering coefficient of the digital low-pass filter is varied so as to regulate the reduction of the dynamic resolution power. The image signal having the dynamic resolution power thus reduced is subjected to the frame skipping processing by the frame skipping processor to obtain an output image signal having the reduced dynamic resolution power and a preferred low frame period.

Imaging equipment in accordance with further aspect of the invention comprises an image pickup device for forming an image signal. The imaging equipment also comprises a digital low-pass filter for filtering the image signal in a time axis direction thereof, thereby lowering the dynamic resolution power in association with the image signal. The imaging equipment further comprises a frame skipping processor for performing frame skipping processing on the image signal obtained through the filtering, thereby forming an output image signal having a preferred frame period. The imaging equipment also comprises a controller for controlling generation of the image signal in the image pickup device, filtering characteristic of the digital low-pass filter, and the frame skipping processing in the frame skipping processor. The imaging equipment still further comprises a switch for selecting either the image signal generated by the image pickup device or the image filtered signal by the digital low-pass filter to output the selected image signal to an image monitor such as an image viewfinder.

In this arrangement, the image signal generated by the image pickup device is filtered by means of a digital low-pass filter in a time axis direction, thereby lowering the dynamic resolution power in association with the image signal. The filtering coefficient of the digital low-pass filter is varied so as to regulate the reduction of the dynamic resolution power. The image signal having the dynamic resolution power thus reduced is subjected to the frame skipping processing to obtain an output image signal having the reduced dynamic resolution power and a preferred low frame period. In addition, either the image signal generated by the image pickup device or the filtered image signal is selected as the output image signal to be displayed on an image monitor such as an image viewfinder.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIGS. 8A-8D show operations of an image pickup device operating at a low shooting speed.

DETAILED DESCRIPTION OF PREFERRED EMBODIMENTS OF THE INVENTION

Figure 1:
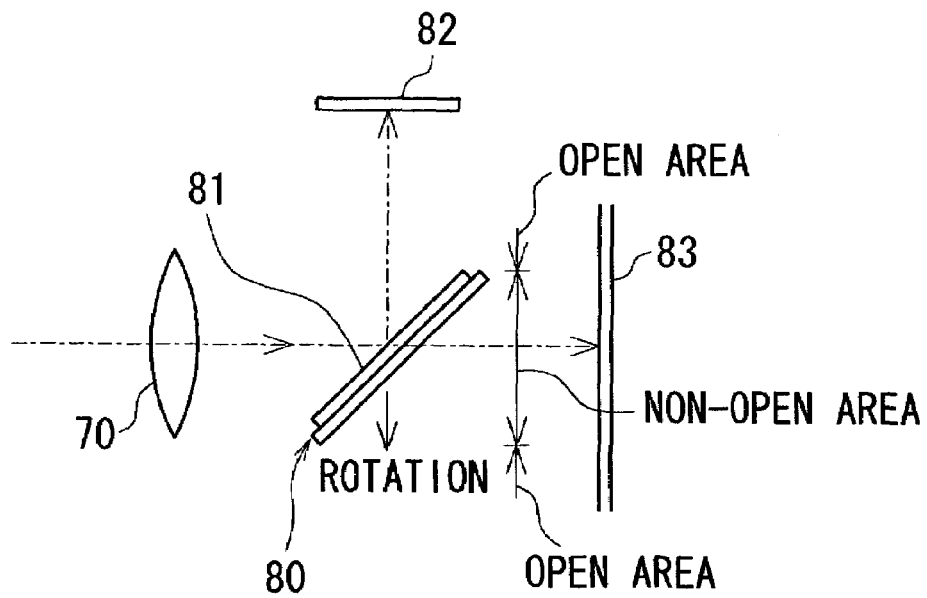
FIG. 1 is a diagram showing operations of a conventional film camera.
Figure 3:
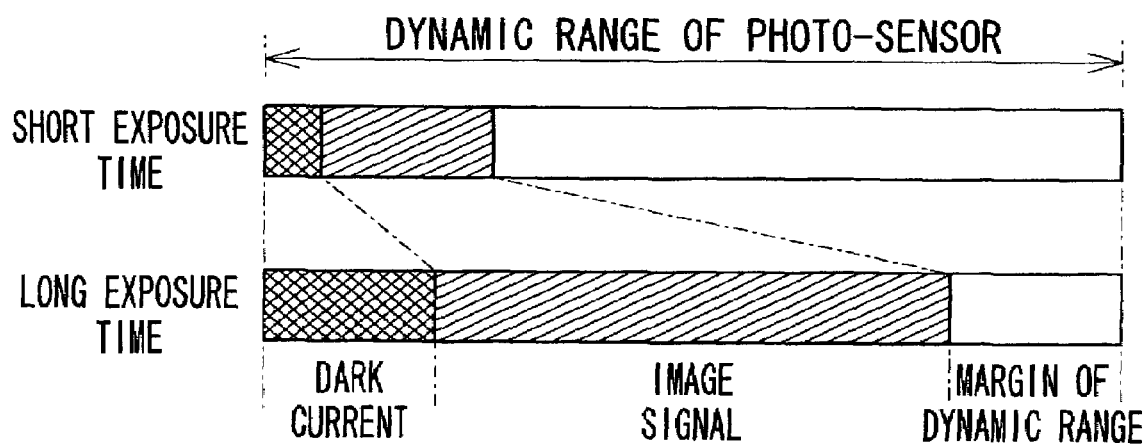
FIG. 3 is a diagram showing the margins of the dynamic range of a photo-sensor for short and long exposure times.
Figures 2A, 2B:
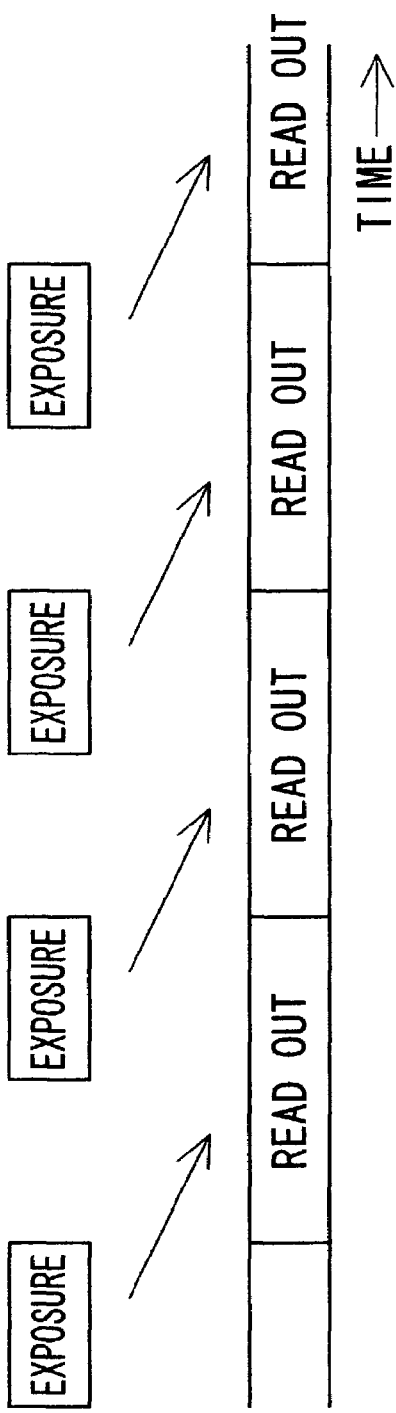
FIGS. 2A and 2B illustrate a case in which time of retrieving signals is elongated to emulate slow shooting.
Figure 4:
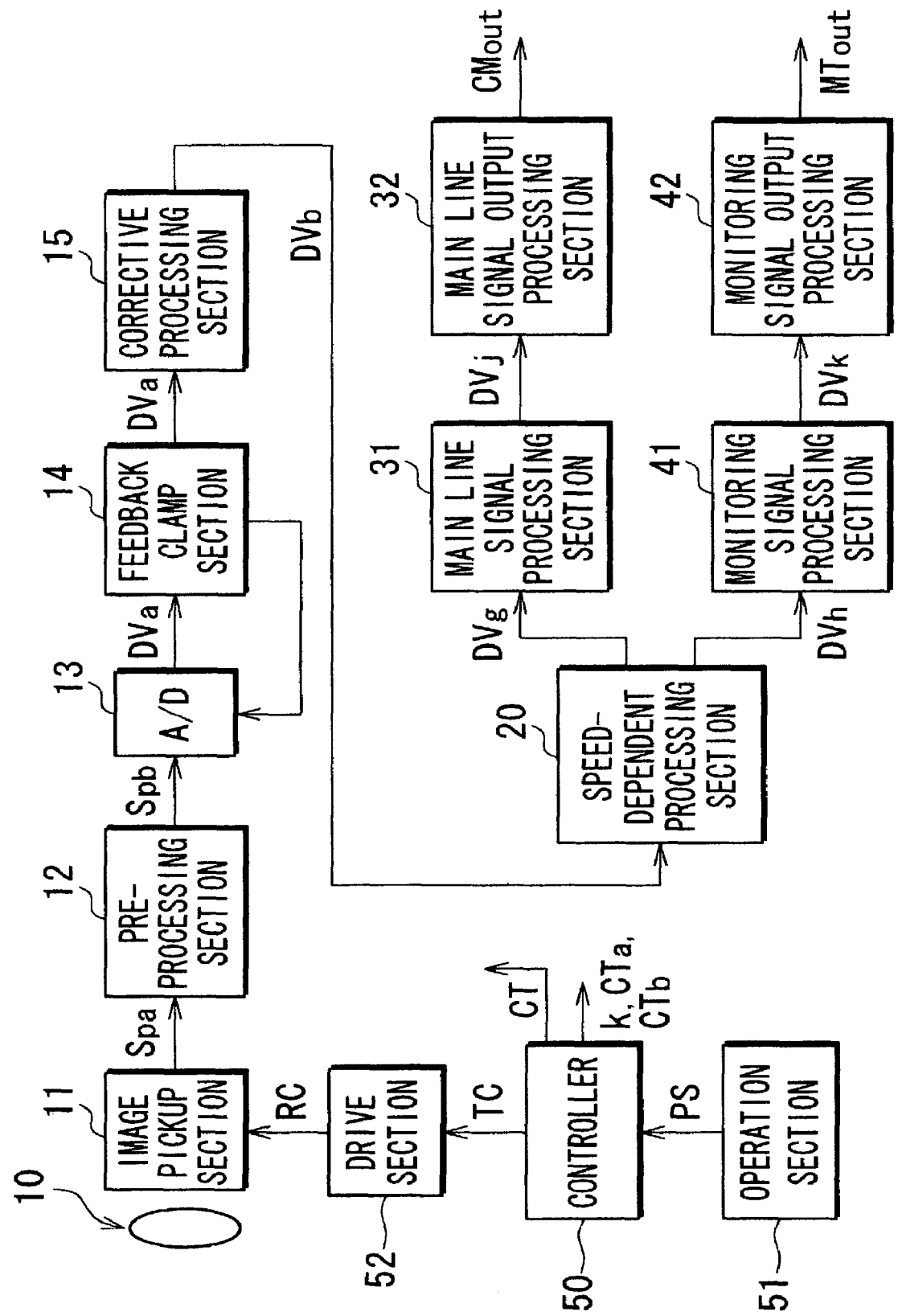
FIG. 4 is a block diagram representation of a video camera in accordance with the invention.

The invention will now be described in detail by way of example with reference to the accompanying drawings. FIG. 4 shows an arrangement of a video camera. Incident beam of light enters through an imaging lens 10 into an imaging pickup section 11 and then an image of an object is formed on the imaging surface of the imaging pickup section 11. The image pickup section 11 is formed of a solid-state image pickup device, e.g. CCD. The image pickup section 11 retrieves, based on a drive signal RC received from a drive section 52 as described later, a signal associated with a picture of the object obtained through photoelectric conversion of the image of the object. The section 11 generates RGB signals Spa, for example, on the imaged picture, and supplies the resultant RGB signals to a pre-processing section 12.

The pre-processing section 12 executes noise-component-removing processing (e.g. correlated double sampling) on the image signal Spa to remove therefrom noise components, and supplies the resultant signal Spa that is removed of noises as an image signal Spb to an A/D conversion section 13. The A/D conversion section 13 converts the image signal Spb into a digital image signal DVa and supplies it to a feedback clamp section 14. The feedback clamp section 14 controls A/D conversion so that an image signal DVa having a stable black level within a predetermined range can be obtained with the difference between the black level signal of a blanking period and a reference signal being detected and supplied to the A/D conversion section 13. A corrective processing section 15 executes corrections to the image signal Dva such as a shading correction and compensation for the defects of the image pickup device. The image signal DVa corrected in the corrective processing section 15 is supplied as an image signal DVb to a speed-dependent processing section 20.

Figure 5:
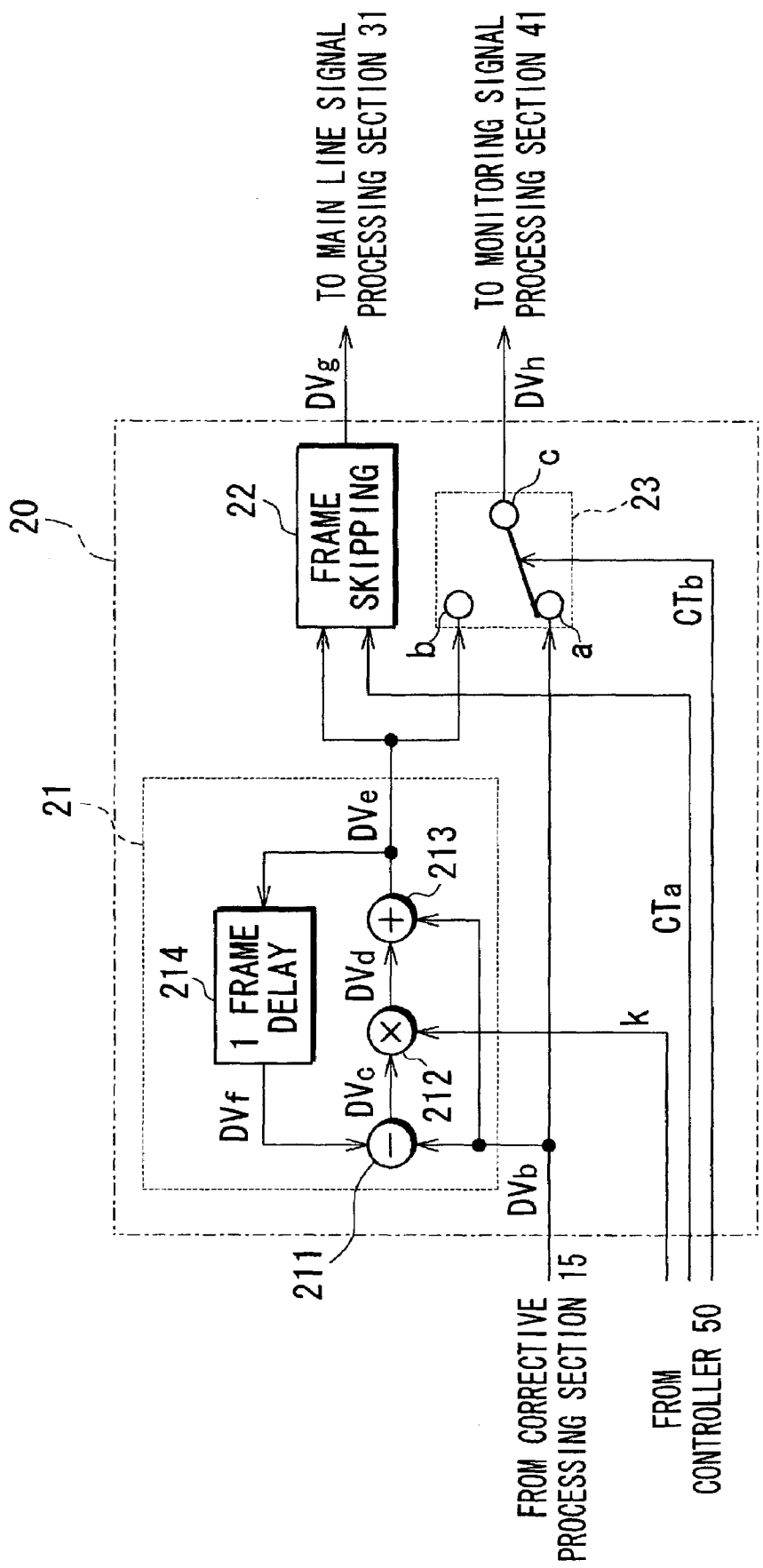
FIG. 5 shows a block diagram representation of a speed-dependent processing section.

FIG. 5 shows a configuration of the speed-dependent processing section 20. A subtracter 211 and an adder 213 of a digital low-pass filter 21 and a terminal "a" of a switch 23 receive the image signal DVb from the corrective processing section 15. The subtracter 211 also receives an image signal DVf from a one-frame delay circuit 214, which will be described later, and subtracts the image signal DVb from the image signal DVf. The resultant subtraction signal DVc obtained by the subtracter 211 is supplied to a multiplier 212.

The multiplier 212 receives a filtering coefficient k from a controller 50 for regulating the filter characteristic of the digital low-pass filter to obtain the same result as could be obtained by the regulation of exposure time. The subtraction signal DVc is multiplied by the filtering coefficient k. The multiplier 212 then obtains and supplies a multiplication signal DVd to the adder 213.

The adder 213 adds the image signal DVb supplied from the corrective processing section 15 and the multiplication signal DVd supplied from the multiplier 212 to generate an image signal DVe. The image signal DVe thus obtained in the adder 213 is supplied to the one-frame delay circuit 214, a frame-skipping circuit 22, and the terminal "b" of the switch 23.

The one-frame delay circuit 214 delays the image signal DVe by 1 frame before it supplies the signal as the image signal DVf to the subtracter 211. The frame-skipping circuit 22 executes frame skipping processing based on a skipping control signal CTa received from the controller 50 to generate an image signal DVg having a preferred frame number (defined by the ratio of frame period/frame rate), which signal is supplied to a main line signal processing section 31 as shown in FIG. 4. The movable terminal "c" of the switch 23 is connected to a monitoring signal processing section 41 shown in FIG. 4. The switch 23 is adapted to select either the image signal DVb or the image signal DVe based on a control signal CTb from the controller 50 and supplies the selected signal as the image signal DVh to the monitoring signal processing section 41.

The maim line signal processing section 31 executes on the image signal DVg the signal processing such as gamma (γ) processing for a video output and outline compensation processing as well as Knee correction. The image signal DVg done with the above signal processing is supplied as an image signal DVj to a main line output processing section 32.

The main line output processing section 32 converts the image signal DVj to a signal CMout suitable for the device connected to the video camera before it is output to the device. For example, when the device complies with component signals and/or composite signals, the image signal DVj is converted into the signal CMout suitable for this device. When the image signal is to be transferred via a serial digital interface that complies with a format known as SMPTE292M, the output processing section 32 casts the image signal DVj into the signal CMout suitable for SMPTE292M-format and outputs it.

The monitoring signal processing section 41 also executes on the image signal DVh the signal processing such as gamma (γ) processing and/or outline compensation processing as well as Knee correction in accordance with an image display device implemented for monitoring the imaged picture. For example, depending on whether the image display device is constituted of a CRT or an LCD, the monitoring signal processing section 41 is switched for any one of Gamma correction characteristic, Knee correction characteristic, and outline compensation characteristic. A monitoring output processing section 42 receives the image signal DVh thus processed from the monitoring signal processing section 41 as an image signal DVk.

The monitoring output processing section 42 converts the received image signal DVk into a signal MTout adequate for a given image display device of image monitor. For example, if the image display device is an analog device, the image signal DVk is converted into an analog signal that is output as the signal MTout.

On the other hand, the controller 50 is connected to an operation section 51. As a user of a video camera operates the operation section 51, the section 51 supplies an operation signal PS to the controller 50. The controller 50 generates various control signals CT based on the operation signal PS to control the associated devices so that the video camera can operate as intended by the user. When, for example, an operation is made on the operation section 51 to select an imaging speed and/or a shutter time (shutter opening time), the controller 50 supplies to the speed-dependent processing section 20 an appropriate filtering coefficient k in accordance with the selected shutter time, causing the speed-dependent processing section 20 to generate an image signal having a dynamic resolution power lowered in accord with the selected shutter time. The controller 50 generates a control signal TC for setting a frame period on reading a signal (hereinafter referred to as "signal read frame period") for the image pickup section 11 in accord with the selected imaging speed and supplies the signal to the drive section 52. The controller 50 also generates control signals CTa and CTb in accord with the selected imaging speed, which are supplied to the speed-dependent processing section 20. The drive section 52 generates the drive signal RC based on the control signal TC and supplies it to the image pickup section 11 in which a signal is read in a set frame period. The speed-dependent processing section 20 performs the frame skipping processing based on the control signal CTa and selects the image signal based on the control signal CTb. The main line signal output processing section 32 outputs the image signal corresponding to the selected imaging speed as well as the monitoring signal output processing section 42 outputs the image signal in accordance with user's operation.

Next, operations of the imaging equipment will be described below. In the speed-dependent processing section 20 as shown in FIG. 5, the image signal DVb and the image signal DVe obtained by filtering the image signal DVb in a time axis direction using a digital low-pass filter 21 have a relationship given by Equation (1) below. The amplitude characteristic of the digital low-pass filter 21 is given by Equation (2) below, where a normalization is made such that the amplitude at ω=0 equals 1.

$$DVe[nT] = \{DVe[n-1]T] - DVb[nT]\}k + DVb[nT] \qquad (1)$$
$$= (1-k)DVb[nT] + kDVe[n-1]T]]$$

$$\frac{1-k}{1+k^2 - 2k\cos\omega T}\sqrt{1 + k^2 - 2k\cos\omega T} \qquad (2)$$

where the angular frequency ω is related to the frame period T of the image signal DVb by ω=π/T, k is the filtering coefficient, and n is a positive integer.

Figure 6:
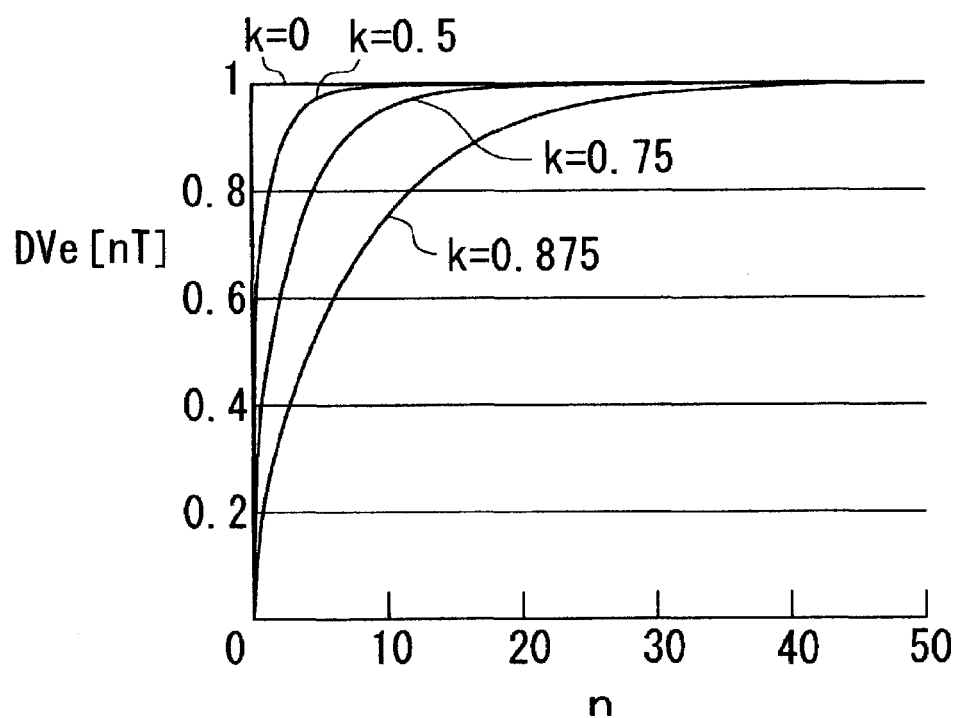
FIG. 6 is a graph showing step response characteristic of the digital low-pass filter.
Figure 7:
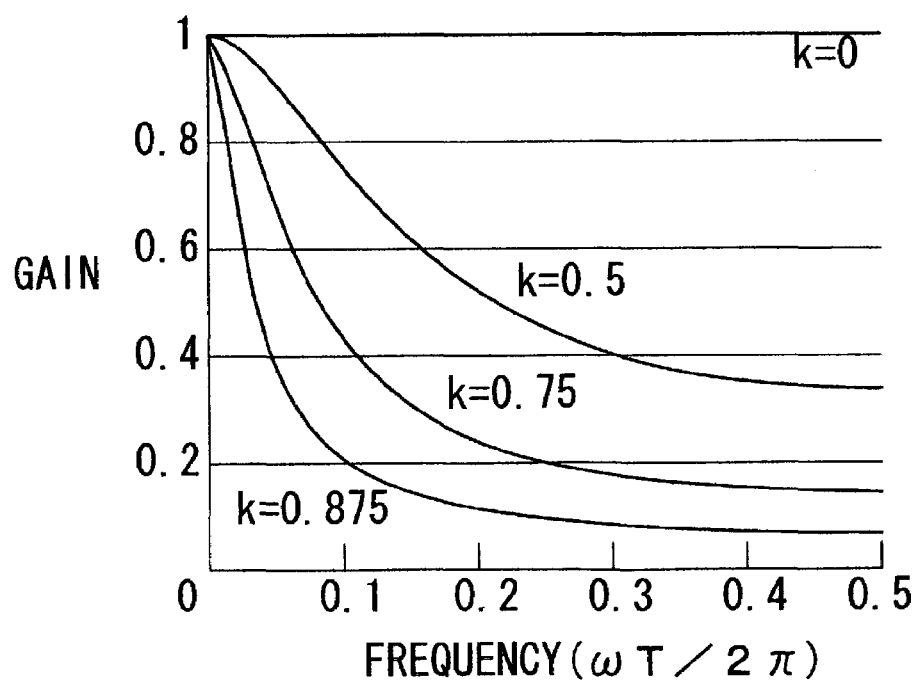
FIG. 7 is a graph showing a frequency characteristic of the digital low-pass filter.

The filter characteristic of the digital low-pass filter 21 of the speed-dependent processing section 20 varies with k. The step response of the filter can be obtained for varying k in the range from 0 to 1. The response becomes less steep for larger k, as shown in FIG. 6. The frequency characteristic of a digital low-pass filter 21 is shown in FIG. 7, from which it is seen that the pass bandwidth decreases with the filtering coefficient k. That is, as the filtering coefficient k increases, the residual image due to the image signal DVe increases and high-frequency components are lost, which manifests that the image is similar to that obtained by incrementing exposure time to lower the dynamic resolution of the image. In other words, by filtering the image signal DVb with a digital low-pass filter 21 having a controlled filtering characteristic, an image signal of a picture similar to that obtained by controlling the exposure time (i.e. controlling the shutter opening time) can be obtained. In short, it is possible to provide emulated control of shutter opening time by changing the filtering coefficient k of the digital low-pass filter 21.

To do this, filtering coefficient k of the digital low-pass filter 21 may be altered to obtain an emulated image signal DVe for a slow shooting by prolonging the exposure time to reduce the dynamic resolution.

Further, the frame-skipping circuit 22 executes frame skipping processing on the image signal DVe in accordance with the imaging speed. In the frame skipping processing performed in the frame-skipping circuit 22, the number of frames to be skipped may be regulated to obtain an image signal having a preferred frame period. Thus, the frame-skipping circuit 22 may emulate variable frame number function of the film camera.

As a result of the frame skipping by the frame-skipping circuit 22 with a regulated number of skipped frame, it is possible to provide an image signal DVg of prescribed frame period that results in a picture similar to the one obtained by reducing the dynamic resolution with a prolonged exposure time.

It will be understood that if the movable terminal "c" of the switch 23 is coupled to the terminal "a", the image signal DVb is supplied to the image display device. Then, an image having a full dynamic resolution and complete frames can be displayed on the image display device. This enables slow shooting of an object to correctly follow the object. Further, by supplying the image signal DVe to the image display device by coupling the movable terminal "c" to the terminal "b", an image can be obtained on the image display device to confirm how much the dynamic resolution is lowered.

For example, if exposure and reading of the image signal are carried out by the solid-state image pickup device of the image pickup section 11 at a frame period of Fa, as shown in FIGS. 8A-8B, and if three frames per four frames are skipped by the frame-skipping circuit 22 of the speed-dependent processing section 20, as shown in FIG. 8C, then the image signal DVg (to be supplied to the signal processing section 31) will have a frame period of Fa/4 and a reduced dynamic resolution that would be obtained by prolonging the exposure time in accord with an appropriate filtering coefficient k.

If the movable terminal "c" of the switch 23 is coupled to the terminal "a" to select the image signal DVb, then the image display device of the image monitor will show an image having a frame period of Fa and a full dynamic resolution, as shown in FIG. 8D. Moreover, If the movable terminal "c" of the switch 23 is coupled to the terminal "b" to select the image signal DVe, then an image having a frame period Fa and based on the image signal DVe supplied to the main signal processing section 31 can be obtained, from which one may estimate how much the dynamic resolution thereof is lowered.

If a slow shooting is not used, the filtering coefficient k is set to 0, and then no frame skipping will be performed in the frame-skipping circuit 22. In this instance, the image signal DVb is the same as the image signal DVe, so that the image signal DVb is supplied to the signal processing section 31 and the monitoring signal processing section 41 without performing the frame skipping processing thereon. Thus, the signal CMout having the maximum frame rate can be output from the video camera. It is also possible to display on the image display device an image having full dynamic resolution. Since the electronic shutter function can be used to shorten exposure time by controlling the read of the signal from the solid-state image pickup device, a high-speed shooting is also possible.

It has been described above that the signal CMout of a video camera is produced to have a preferred frame rate by altering the number of skipped frames in the frame skipping circuit 22. However, it is also possible to generate a signal having a preferred frame rate by altering not only the number of skipped frames but also the data read frame period of the image pickup section 11 by the control signal TC.

In this case, an appropriate number of the frame to be skipped and an appropriate data read frame period of the image pickup section 11 are selected such that the data read frame period of the image pickup section 11 does not exceed a predetermined integral multiple of the minimum frame period that can be attained by the image pickup device. For example, if the frame period To of a signal CMout (referred to as "output frame period") does not exceed twice the minimum frame period Tmin that can be attained by the image pickup device (i.e. Tmin<To≦2Tmin), no frame skipping is performed and only the signal read frame period Ti is altered to obtain a signal having a preferred frame rate. If the output frame period To exceeds 2Tmin but not 3Tmin (i.e. 2Tmin<To≦3Tmin), then signal read frame period Ti is reduced to one half of it, so that frame skipping is performed for every two frames. When the frame period To exceeds 3Tmin but not 4Tmin (3Tmin<To≦4Tmin), the signal read frame period Ti is reduced to ⅓ of it, so that frame skipping is performed every three frames. In this manner, when the output frame period To exceeds n times of the minimum frame period Tmin but not (n+1) times (nTmin<To≦(n+1) Tmin), then the signal read frame period Ti is reduced to 1/n of it, so that frame skipping is performed for every n frames. Thus, the signal read frame period Ti is always shortened.

Since the signal read frame period Ti does not exceed a predetermined period if the output frame period To is made arbitrarily longer, the frame period To can be made longer and the influences of dark current and smear generated in the image pickup section 11 can be limited. Thus, deterioration of the S/N ratio and the loss of the margin of dynamic range can be suppressed accordingly. The number of frames to be skipped can be decreased by making the signal read frame period longer. In a case where the movable terminal "c" of the switch 23 is coupled to the terminal "a" to select the image signal DVb to monitor the imaged picture on the electronic viewfinder, lowering of the dynamic resolution can be suppressed since the frame period of the image signal DVb will remain within the predetermined period.

While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. An apparatus for processing an image signal, comprising:
    a filter for digitally filtering an input image signal in a time axis direction thereof, thereby lowering resolution power for an object in the time axis direction in association with said image signal;
    means for altering a filter coefficient of the filter in accordance with shutter opening time; and
    a frame skipping processor for performing frame skipping processing on the filtered input image signal, thereby obtaining an output image signal having a preferred frame period.

2. The apparatus according to claim 1, further comprising a controller for altering a filtering coefficient of said filter.

3. An apparatus for processing en image signal, comprising:
    filter means for digitally filtering an input image signal in a time axis direction thereof, thereby lowering resolution power for an object in the time axis direction in association with said image signal;

means far altering a filter coefficient of the filter in accordance with shutter opening time; and frame-skipping means for performing frame skipping processing on the filtered input image signal, thereby obtaining an output image signal having a preferred frame period.

4. The apparatus according to claim 3, further comprising means for altering a filtering coefficient of said filter means.

5. A method for processing an image signal, comprising steps of: digitally filtering an input image signal in a time axis direction thereof using a digital low-pass filter, thereby lowering resolution power for an object in the time axis direction in association with said input image signal; altering a filter coefficient of a the digital low-pass filter in accordance with shutter opening time; and frame skipping processing on the filtered input image signal, thereby obtaining an output image signal having a preferred frame period.

6. The method for processing an image signal according to claim 5, further comprising a step of altering a filtering coefficient of said digital low-pass filter.

7. Imaging equipment, comprising:

an image pickup device for forming an image signal;

a digital low-pass filter for digitally filtering said image signal in a time axis direction thereof, thereby lowering resolution power for an object in the time axis direction in association with said image signal;

means for altering a filter coefficient of the digital low pass filter in accordance with shutter opening time;

a frame skipping processor for performing frame skipping processing on the filtered image signal, thereby forming an output image signal having a preferred frame period; and a controller for controlling generation of said image signal in said image pickup device, filtering characteristic of said digital low-pass filter, and said frame skipping processing in said frame skipping processor.

8. The imaging equipment according to claim 7, wherein said controller allows for varying the frame period of said image signal generated by said image pickup device within a predetermined range, and wherein said controller controls frame skipping processing performed by said frame skipping processor, thereby obtaining an output image signal having said preferred frame period.

9. The imaging equipment according to claim 7, further comprising:

a switch for selecting one of said image signal generated by said image pickup device or said image filtered signal by said digital low-pass filter to output said selected image signal to an image monitor.

10. The imaging equipment according to claim 7, wherein said controller varies a filtering coefficient of said digital low-pass filter, thereby regulating said resolution power.

11. Imaging equipment, comprising:

image pickup means for picking up an object image and forming an image signal;

a digital low-pass filter for digitally filtering said image signal in a time axis direction thereof, thereby lowering resolution power for an object in the time axis direction in association with said image signal;

means for altering a filter coefficient of the digital low pass filter in accordance with shutter opening time;

frame-skipping means for performing frame skipping processing on said filtered image signal, thereby forming an output image signal having a preferred frame period; and control means for controlling generation of said image signal in said image pickup means, filtering characteristic of said digital low-pass filter, and said frame skipping processing in said frame skipping means.

12. The imaging equipment according to claim 11, wherein said control means varies the frame period of said image signal generated by said image pickup means within a predetermined range, and wherein said control means controls frame skipping processing performed by said frame skipping means, thereby obtaining an output image signal having said preferred frame period.

13. The imaging equipment according to claim 11, further comprising:

switching means for selecting one of said image signal generated by said image pickup means or said filtered image signal by said digital low-pass filter to output said selected image signal to an image monitor.

14. The imaging equipment according to claim 11, wherein said control means varies a filtering coefficient of said digital low-pass filter, thereby regulating the lowering in said resolution power.

* * * * *